United States Patent
Schroeder et al.

(10) Patent No.: US 6,707,592 B1
(45) Date of Patent: Mar. 16, 2004

(54) OPTICAL SWITCH WITH STATIC BUBBLE

(75) Inventors: Dale W. Schroeder, Scott's Valley, CA (US); John J. Uebbing, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/288,675

(22) Filed: Nov. 5, 2002

(51) Int. Cl.$^7$ ............................. G03H 1/00; G02B 5/32
(52) U.S. Cl. ......................... 359/290; 385/14; 385/15; 385/18
(58) Field of Search ................. 359/290, 291, 359/296, 302, 321, 270, 263, 254, 250, 237; 385/14, 15, 18, 39

(56) References Cited

U.S. PATENT DOCUMENTS

| | | |
|---|---|---|
| 4,988,157 A | 1/1991 | Jackel et al. |
| 5,699,462 A * | 12/1997 | Fouquet et al. ............... 385/18 |
| 6,188,815 B1 | 2/2001 | Schiaffino et al. |
| 6,212,308 B1 | 4/2001 | Donald |
| 6,327,397 B1 | 12/2001 | Schiaffino et al. |
| 6,360,775 B1 * | 3/2002 | Barth et al. ................. 137/828 |
| 2003/0012483 A1 * | 1/2003 | Ticknor et al. ............... 385/16 |

* cited by examiner

*Primary Examiner*—Hung Dang
*Assistant Examiner*—Joseph Martinez

(57) ABSTRACT

A bubble optical switch includes a switching chamber, a static bubble drum, and a quenching pipe. The static bubble drum is adapted to contain a static bubble. In the inactive state, the static bubble remains within the static bubble drum and the switching chamber is filled with index matching fluid. To activate the switch, heat is introduced expanding the static bubble into the switching chamber displacing the index matching fluid with vapor. Then, the optical signal is reflected from the wall of the switching chamber. When the heat is removed, the static bubble contracts back into the static bubble drum. Because the temperature required to expand the static bubble is lower than the temperature required to nucleate a bubble from the fluid, the reliability and lifetime of the switch is increased. Further, due to the properties of the contracting static bubble, no residual bubble forms, thereby alleviating problems associated with residual bubbles of the prior art bubble switches.

21 Claims, 3 Drawing Sheets

OPTICAL SWITCH WITH STATIC BUBBLE

BACKGROUND

The present invention relates to optical switches and more particularly to bubble optical switches.

Optical communication networks use optical waveguides to transmit optical signals representing data. At various points along the network, optical switches are used to route optical signals from one waveguide to another. One type of optical switch uses fluids and vapor bubbles to switch optical signals. This type of switch is often referred to as a bubble switch. In this design, trenches are formed where the waveguides intersect and are filled with an index matching fluid, the index matching fluid having refractive index that is the same as the refractive index of the optical waveguides.

In an inactive state, a bubble switch includes a trench filled with index matching fluid. Because the index matching fluid has the same refractive index as the waveguide segments that intersect that the bubble switch, no switching is performed at the switch. That is, an optical signal from a first waveguide segment enters the fluid filled trench, passes straight through the fluid-filled trench, and enters a second waveguide segment. To activate the bubble switch, heat is applied to nucleate a bubble within the trench. The bubble displaces the fluid within the trench and fills the trench with vapor. The vapor has a refractive index that is close to one. Accordingly, the optical signal from the first waveguide is reflected at the wall of the vapor-filled trench and enters a third waveguide segment. To inactivate the bubble switch, heat is removed from the switch allowing the bubble to collapse and the index matching fluid to again fill the trench. The portion of the trench wherein the bubble displaces the index matching fluid is often referred to as a switching chamber.

For fast switch activation, the bubble must be nucleated quickly. This requires application of high temperature to the switch to quickly bring the index matching fluid to a boil to create vapor for the bubble. For example, for some index matching fluid, temperatures of up to 225 degrees Celsius are required for nucleation. Once the bubble is nucleated, it can be maintained at a lower temperature such as 100 degrees Celsius. The high temperature required for nucleation stresses the bubble switch thus reduces the lifetime and reliability of the switch.

For fast switch deactivation, the bubble must be completely collapsed within the index matching fluid. However there is often air or other gaseous impurities in the fluid. These impurities must dissolve back into the fluid. The dissolution process is often inconsistent, leaving residual bubbles for 30 milliseconds or more. This causes disturbance in the path of optical signals and an inconsistent switch turn off time.

Consequently, there remains a need for an improved bubble optical switch that alleviates these shortcomings.

SUMMARY

The need is met by the present invention. According to one aspect of the present invention, an optical switch includes a static bubble drum and a switching chamber. The static bubble drum is adapted to contain a static bubble. The switching chamber is adapted to allow the static bubble to expand into it from the static bubble drum.

According to another aspect of the present invention, each optical switch in a plurality of optical switches includes a static bubble drum and a switching chamber. The static bubble drum is adapted to contain a static bubble. The switching chamber is adapted to allow the static bubble to expand into it from the static bubble drum. Each optical switch in the plurality of optical switches also includes a heater that is proximal to the static bubble drum, switching chamber, or both.

According to yet another aspect of the present invention, a method for switching optical signal includes applying heat to a static bubble drum. The heat expands a static bubble from the drum into a switching chamber.

Other aspects and advantages of the present invention will become apparent from the following detailed description, taken in conjunction with the accompanying drawings, illustrating by way of example the principles of the invention.

DETAILED DESCRIPTION

As shown in the exemplary drawings and discussed herein below, the present invention is embodied in an optical switch containing fluid with a switching chamber connected to a static bubble drum. The static bubble drum contains a static bubble that remains in the drum during the switch's inactive or off state. To activate or turn on the switch, the bubble drum is heated thereby expanding the bubble into the switching chamber. To deactivate or turn off the switch, the heat is removed, thereby allowing contraction of the expanded bubble into the static bubble drum. A temperature that is lower than the nucleation temperature can be used to activate the switch because it is not necessary to form or nucleate the bubble from the fluid. Therefore, the reliability of the optical switch is improved because lower temperatures are used. Furthermore, the bubble is contracted rather than totally dissolved to deactivate the switch thereby increasing the deactivation speed of the switch.

An additional advantage of the present invention is the reduction of hydrodynamic cross talk. An optical switching array includes an array of bubble switches interconnected via a common fluid filled layer including index matching fluid. Because the switches are connected via the common fluid layer, in the prior art designs, turning switches on or off (by nucleating or collapsing bubbles) introduces sharp pressure waves within the fluid filled layer, the pressure waves having a relatively high peak pressure. The sharp pressure waves travel within the fluid filled layer causing hydrodynamic cross talk between the bubble switches within the optical switching array. Such cross talk is alleviated in the present invention because the on and off operations of the bubble switch are performed by expansion and contraction of the static bubble. These operations introduce significantly lower peak pressure that affects the other switches within the switching array.

Figure 1:
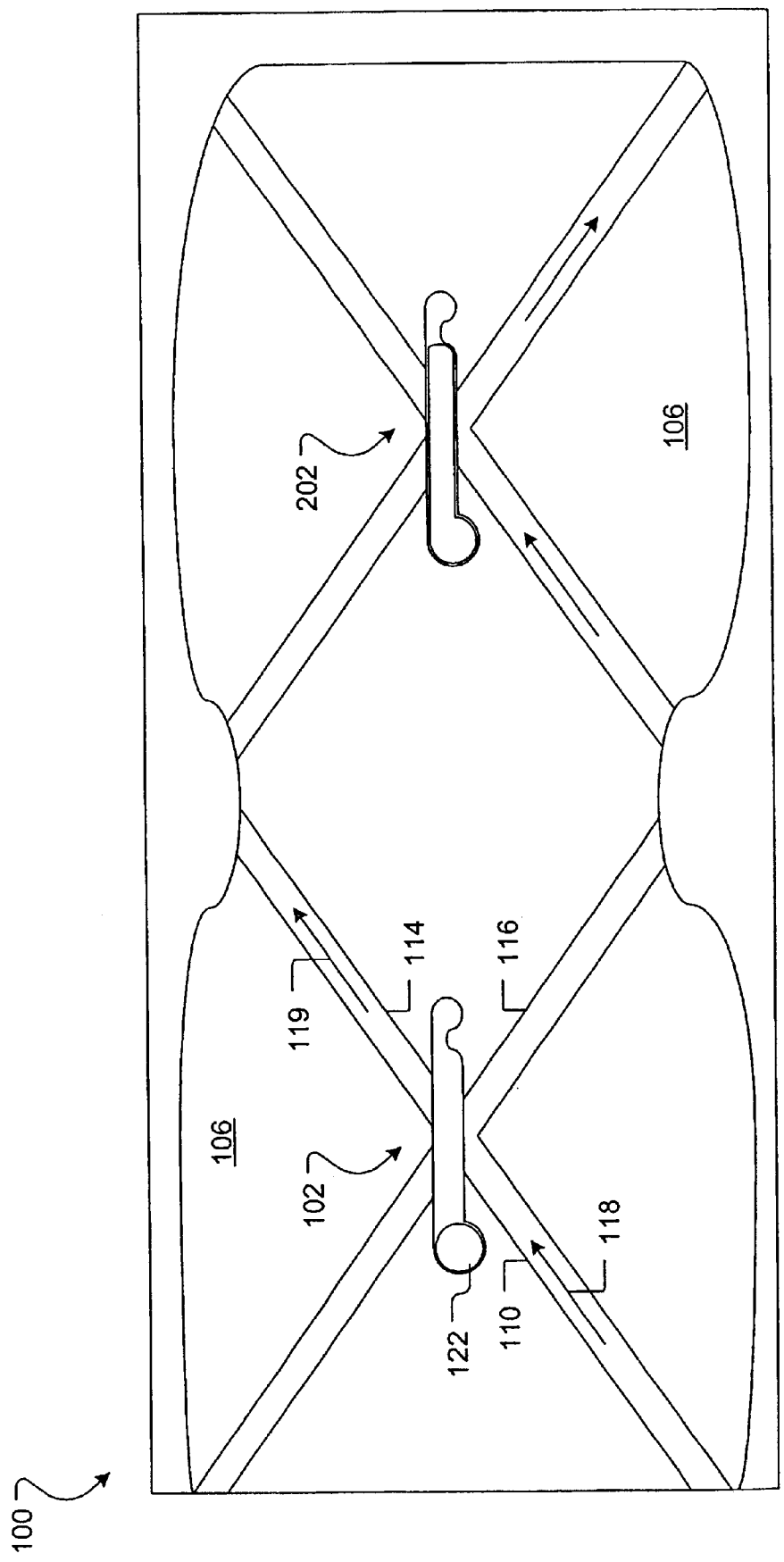
FIG. 1 is a simplified cutaway top view of an optical switch array according to one embodiment the present invention.
Figure 2A:
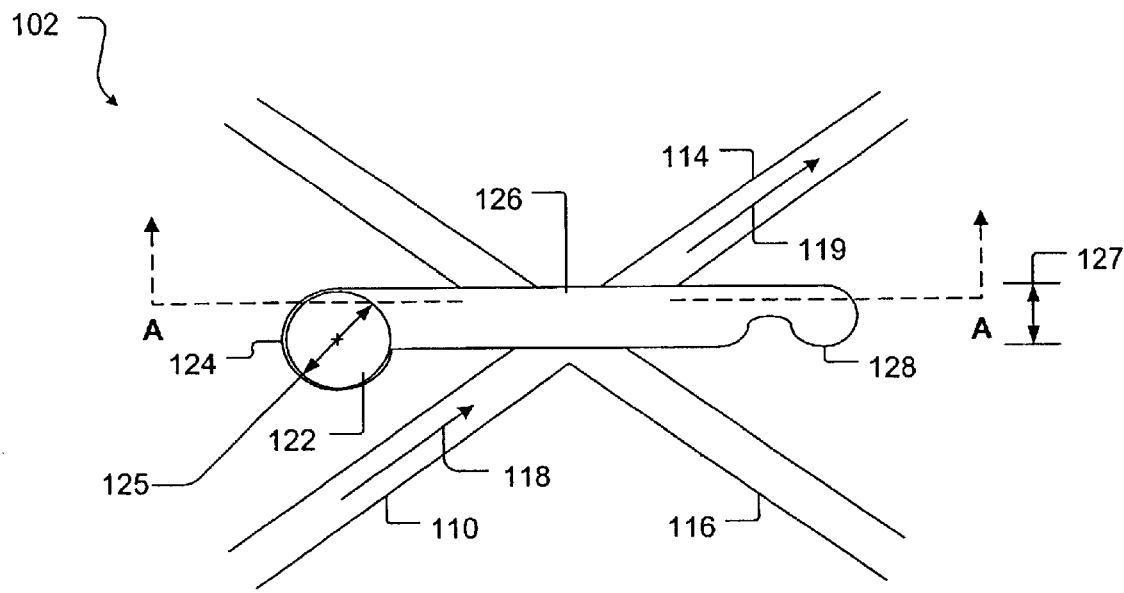
FIG. 2A is a top view of a first optical switch of the optical switch array of FIG. 1 in an inactive state.

In FIG. 1, an optical switch array 100 according to one embodiment of the present invention is illustrated. For simplicity, only two switches are illustrated therein. A first optical switch 102 is illustrated at a first state referred to as an inactive state. A second optical switch 202 is illustrated at a second state referred to as an active state. FIG. 2A illustrates a top view of the first optical switch 102 in the inactive state. For purposes of discussion, the first optical switch 102 of FIG. 2A is also referred to as an inactive optical switch 102.

Referring to FIGS. 1 and 2A, a first set of waveguide segments 110–116 intersect at the inactive optical switch 102. The inactive optical switch 102 includes a switching chamber 126, or a trench, filled with index matching fluid. Portion of the trench whereat optical signals from the waveguide segments 110–116 are reflected is generally referred to as the switching chamber 126. In one embodiment, the switching chamber 126 can be approximately 15 microns in width 127. A static bubble drum 124 is connected to the switching chamber 126. In one embodiment, the static bubble drum 124 can be approximately 40 microns in diameter 125. The static bubble drum 124 is adapted to contain an inactive static bubble 122.

The static bubble drum 124 is able to contain the static bubble 122 because the surface tension generates pressure across the bubble-liquid interface proportional to $\sigma/r_{bub}$, where $\sigma$ is the surface tension and $r_{bub}$ is the radius of the bubble. The static bubble drum 124 has a diameter 125 that is greater than the width 127 of the switching chamber 126, and the pressure difference between the index matching fluid and the inside of the bubble is not enough to collapse the status bubble 122 in the static bubble drum 124. In the switching chamber 126, however, the size, or width 127, of the switching chamber 126 is smaller than the diameter 125 of the bubble drum 124, and surface tension induced pressure from the index matching fluid will collapse a bubble (were it to form within the switching chamber 126) in the absence of additional pressure within the bubble generated by heat. Heat raises the bubble temperature and this raises the pressure within the bubble by way of the increased vapor pressure.

In the inactive state, the static bubble 122 remains in the static bubble drum 124 and the switching chamber 126 is filled with the index matching fluid. Thus, the inactive optical switch 102 allows an optical signal 118 to traverse straight through the switching chamber 126 from a first waveguide segment 110 to a second waveguide segment 114. The optical signal within the second waveguide segment 114 is illustrated as a non-switched optical signal 119.

Figure 2B:
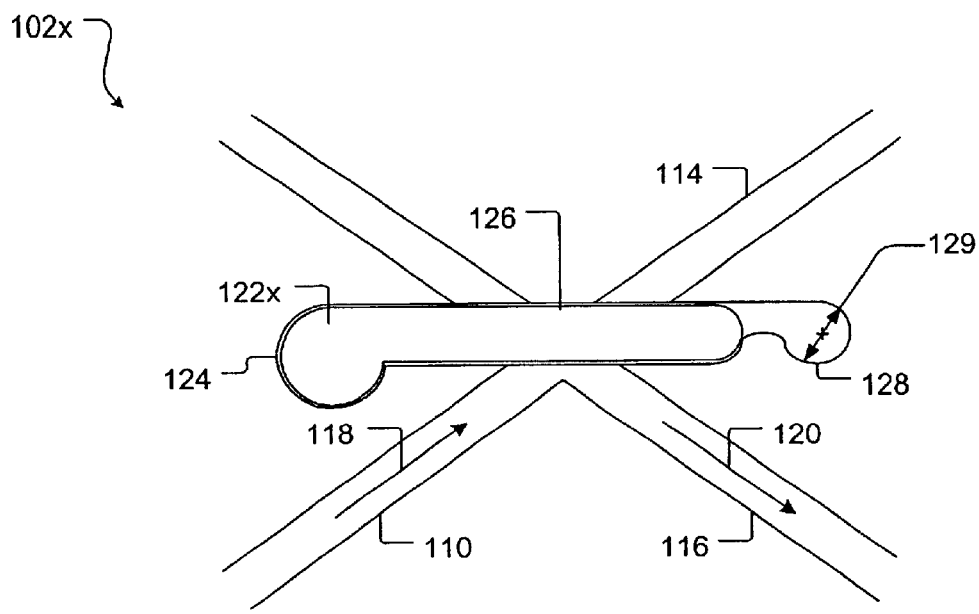
FIG. 2B is a top view of the first optical switch of the optical switch array of FIG. 1 in an active state.

To activate the inactive optical switch 102, the static bubble drum 124, the switching chamber 126, or both are heated causing the static bubble 122 to expand into the switching chamber 126. The heat increases the bubble temperature and increases the evaporation of heated fluid. The fluid vapor pressure increases with temperature. This higher pressure is enough to overcome the surface tension forces that keep the static bubble 122 in the static bubble drum 126. The static bubble 122 then expands into the switching chamber 126. The expanded bubble 122x, also referred to as an active bubble 122x, is illustrated in FIG. 2B. The temperature required to expand the inactive static bubble 122 into the switching chamber 126 is less than the temperature required to nucleate a bubble from the index matching fluid. For example, a temperature of 100 degrees Celsius may be sufficient to expand the static bubble 122 whereas a homogeneous nucleation temperature of 225 degrees Celsius may be needed to create a bubble. As a result, less heat and less stress are applied to the switch 102 thereby increasing the lifetime and reliability of the switch 102. For example, some of the components of the switch 102, such as a pillow, are less likely to deteriorate from excessive heat otherwise required to nucleate the bubble from the index matching fluid. The switching chamber 126 is adapted to allow the inactive static bubble 122 to expand into it from the static bubble drum 124.

Referring to FIG. 2B, the first optical switch 102 in FIG. 1 is illustrated in the active or on state. For purposes of discussion, the optical switch in FIG. 2B is referred to as an active optical switch 102x herein. The active optical switch 102x is illustrated having a similar structure as the inactive optical switch 102 of FIG. 2A. The configuration and the dimensions of the active optical switch 102x are generally similar to the corresponding portions of the inactive optical switch 102 including the switching chamber 126, the static bubble drum 124, and a quenching pipe 128.

In the active state, the active bubble 122x fills the switching chamber 126 with vapor. As already discussed, the refractive index of the vapor within the active bubble 122x is nearly equal to one. Thus, the active optical switch 102x reflects, or switches, the optical signal 118 from the first waveguide segment 110 to a third waveguide segment 116. The reflected optical signal is illustrated as a switched signal 120.

To deactivate the active optical switch 102x, the heat is removed allowing the active optical switch 102x to cool. As the temperature and thus the pressure in the bubble decreases, surface tension forces the active bubble 122x to contract away from the switching chamber 126 into the static bubble drum 124. When the expanded bubble 122x contracts, the index matching fluid rushes into the switching chamber 126 to fill the space being vacated by the contracting bubble.

The switching chamber 126 is connected to a quenching pipe 128 providing additional paths for the index matching fluid to enter the switching chamber 126. In one embodiment, the quenching pipe 128 is approximately 15 microns in diameter 129. The quenching pipe 128 facilitates replacing the space within the switching chamber 126 (vacated by the contracting active bubble 122x) with the index matching fluid. The active bubble 122x contracts and eventually resembles the inactive static bubble 122 of FIG. 2A.

The active bubble 122x need not collapse completely in order to deactivate the switch 102x. Accordingly, the deactivation of the active switch 102x is accomplished more quickly than in prior art. Further, no residual air bubbles are formed because the bubble, when contracting, holds all the vapor and residual air. The switching chamber 126 is again filled with the index matching fluid allowing the first optical signal 118 to pass directly through the switching chamber 126 as illustrated in FIG. 2A.

Figure 3:
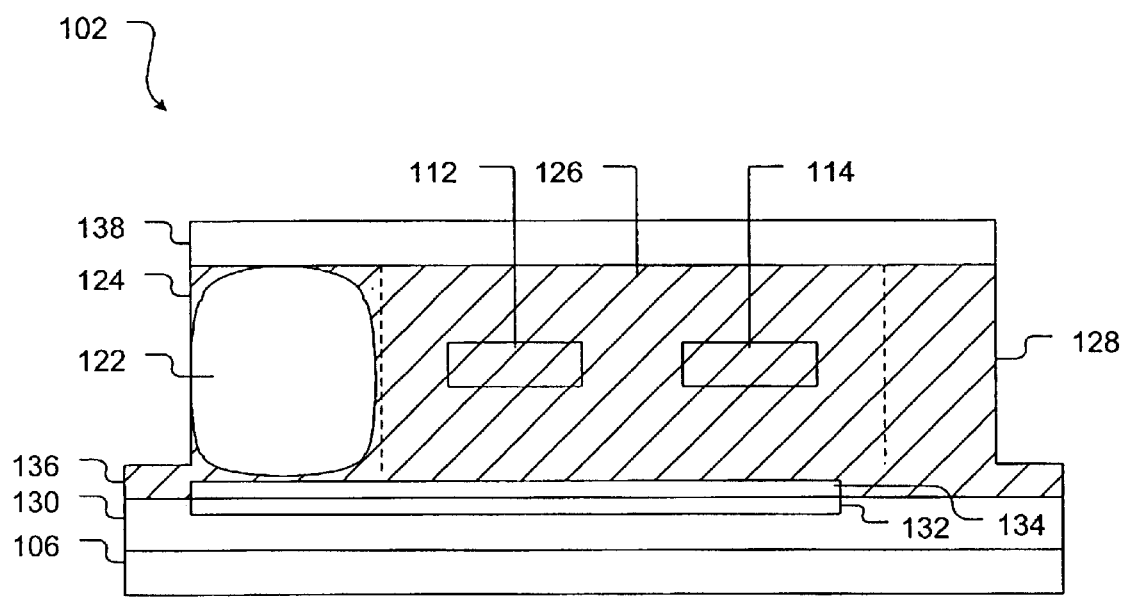
FIG. 3 is a cutaway side view of the first optical switch of FIG. 2A.

FIG. 3 is a cutaway side view of the inactive optical switch 102 of FIG. 2A along line A—A. Referring to FIGS. 2A and 3, the inactive optical switch 102 has a bottom layer 106 as a substrate, typically made of silicon. A bottom integrated circuit (IC) passivation layer 130 is fabricated over the substrate 106. The bottom IC passivation layer 130 can be fabricated from silicon dioxide. A heater 132 is typically fabricated within the bottom IC passivation layer 130. The heater 132 can be buffered by a pillow 134 as illustrated. The pillow 134, made of for example gold, buffers the heat generated by the heater 132. The heater 132 and the pillow 134 are proximal to the static bubble drum 124, the switching chamber 126, or both. The heater 134 provides heat to the static bubble drum 124, the switching chamber 126, or both, the heat causing the expansion of the inactive static bubble 122 as discussed herein above.

The switching chamber 126, the static bubble drum 124, and the quenching pipe 128 are generally located above and connected to a fluid filled layer 136. The index matching fluid is generally present in these chambers except as displaced by the inactive static bubble 122. As already illustrated and discussed, in the inactive state, the static bubble drum 124 contains the inactive static bubble 122, therefore a majority of the fluid within the static bubble drum 124 is displaced by the static bubble 122. In the active state, the static bubble drum 124 and the switching chamber 126 are filled with the active bubble 122x of FIG. 2B. A top structural layer 138 covers and encloses the switch 102. For example this layer 138 can be fused silica.

From the foregoing, it will be apparent that the present invention is novel and offers advantages over the current art. Although the specific embodiment of the invention is described and illustrated above, the invention is not to be limited to the specific forms or arrangements of parts so described and illustrated. For example, differing configurations, sizes, or materials may be used to practice the present invention. The invention is limited by the claims that follow. In the following, claims drafted to take advantage of the "means or steps for" provision of 35 USC section 112 are identified by the phrase "means for."

What is claimed is:

1. An optical switch comprising:
   a static bubble drum adapted to contain a static bubble; and
   a switching chamber connected to said static bubble drum, said switching chamber adapted to allow the static bubble to expand into said switching chamber.

2. The optical switch recited in claim 1 further comprising a heater proximal to said static bubble drum.

3. The optical switch recited in claim 2 wherein said heater is proximal to said switching chamber.

4. The optical switch recited in claim 2 wherein said heater comprises a resistor.

5. The optical switch recited in claim 2 further comprising a pillow proximal to said heater.

6. The optical switch recited in claim 1 further comprising a quenching pipe connected to said switching chamber.

7. The optical switch recited in claim 6 wherein said quenching pipe has a diameter generally ranging from 10 microns to 20 microns.

8. The optical switch recited in claim 1 wherein said static bubble drum has a diameter generally ranging from 20 microns to 60 microns.

9. The optical switch recited in claim 1 wherein said switching chamber has a width generally ranging from 10 microns to 20 microns.

10. An optical switch array comprising a plurality of optical switches wherein each of said optical switches comprises:
    a static bubble drum adapted to contain a static bubble;
    a switching chamber connected to said static bubble drum, said switching chamber adapted to allow the static bubble to expand into said switching chamber; and
    a heater proximal to said static bubble drum.

11. The optical switch recited in claim 10 wherein said heater is proximal to said switching chamber.

12. The optical switch recited in claim 10 wherein said heater comprises a resistor.

13. The optical switch recited in claim 10 further comprising a pillow proximal to said heater.

14. The optical switch recited in claim 10 further comprising a quenching pipe connected to said switching chamber.

15. The optical switch recited in claim 14 wherein said quenching pipe has a diameter generally ranging from 10 microns to 20 microns.

16. The optical switch recited in claim 10 wherein said static bubble drum has a diameter generally ranging from 20 microns to 60 microns.

17. The optical switch recited in claim 10 wherein said switching chamber has a width generally ranging from 10 microns to 20 microns.

18. The method for switching optical signals, the method comprising heating a static bubble drum to expand a static bubble from said static bubble drum into a switching chamber connected to said static bubble drum thereby changing optical properties within the switching chamber.

19. The method recited in claim 18 further comprising heating said switching chamber.

20. The method in claim 19 further comprising buffering said heat with a pillow.

21. The method in claim 18 further comprising removing the heat from said static bubble drum to allow contraction of said static bubble back into said static bubble drum.

* * * * *